(12) United States Patent
Johnson

(10) Patent No.: US 10,852,752 B2
(45) Date of Patent: Dec. 1, 2020

(54) HIGH FLOW LOW PRESSURE CONTROL VALVE

(71) Applicant: Hitachi Metals, Ltd., Tokyo (JP)

(72) Inventor: Ryan Johnson, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 23 days.

(21) Appl. No.: 16/264,319

(22) Filed: Jan. 31, 2019

(65) Prior Publication Data

US 2019/0265738 A1     Aug. 29, 2019

Related U.S. Application Data

(60) Provisional application No. 62/635,326, filed on Feb. 26, 2018.

(51) Int. Cl.
*G05D 7/06* (2006.01)

(52) U.S. Cl.
CPC .................. *G05D 7/0635* (2013.01)

(58) Field of Classification Search
CPC ..................................... G05D 7/0635
See application file for complete search history.

(56) References Cited

U.S. PATENT DOCUMENTS

| 8,844,901 | B2 | 9/2014 | Hayashi | |
|---|---|---|---|---|
| 8,967,200 | B2 | 3/2015 | Hayashi | |
| 9,328,826 | B2 * | 5/2016 | Hayashi | ................ F16K 31/007 |
| 9,371,930 | B2 | 6/2016 | Hayashi | |
| 2012/0255630 | A1 | 10/2012 | Hayashi | |
| 2013/0048898 | A1 | 2/2013 | Hayashi | |
| 2014/0190578 | A1 | 7/2014 | Hayashi | |

FOREIGN PATENT DOCUMENTS

JP     1990116071 U1     9/1990

OTHER PUBLICATIONS

Tanihana, Masayuki, "International Search Report Regarding International Application No. PCT/JP2019/006676", dated May 28, 2019, p. 10, Published in: JP.

* cited by examiner

*Primary Examiner* — Eric Keasel
(74) *Attorney, Agent, or Firm* — Neugeboren O'Dowd PC

(57) ABSTRACT

Mass flow controllers and control valves are disclosed. A control valve includes a poppet including a plurality of vertical flow channels, and the control valve also includes an orifice element that includes a plurality of vertical flow channels extending from a bottom surface of the orifice element, through the orifice element, to a top surface of the orifice element. The vertical flow channels of the orifice element are axially misaligned with the vertical flow channels of the poppet to prevent gas from flowing through the orifice element when the gap between the top surface of the poppet and the bottom surface of the orifice element is closed.

9 Claims, 18 Drawing Sheets

HIGH FLOW LOW PRESSURE CONTROL VALVE

CLAIM OF PRIORITY UNDER 35 U.S.C. § 119

The present application for patent claims priority to Provisional Application No. 62/635,326, entitled "HIGH FLOW LOW PRESSURE VALVE DESIGN," filed Feb. 26, 2018, and assigned to the assignee hereof and hereby expressly incorporated by reference herein.

BACKGROUND

Field

The present invention relates to systems and methods for mass flow control. In particular, but not by way of limitation, the present invention relates to valves of mass flow controllers.

Background

Mass flow controllers are available to regulate a mass flow rate of a fluid (e.g., a gas) to a desired location. For example, some mass flow controllers are utilized in environments where a processing gas is delivered to a processing application (e.g., plasma processing) in very low, yet precise, mass flow rates.

Other mass flow controllers are utilized to regulate a flow of a gas at high flow rate such as, for example, flow rates greater than 100 standard liters per minute (SLM), but existing mass flow controllers require relatively high inlet pressures and require a large valve opening or span. There is currently a need for mass flow controllers that operate at a high flow rate and low inlet pressure (e.g., to convey a gas to a desired location). Thus, existing mass flow controllers are either incapable (or are very inefficient) at meeting this need.

SUMMARY

According to an aspect, a control valve includes a valve cavity including an inlet port and an outlet port. A poppet is disposed within the valve cavity, and the poppet includes a plurality of vertical flow channels, and a bottom surface of the poppet faces the inlet port. An orifice element is disposed within the valve cavity between the poppet and the outlet port, the orifice element includes a push rod slot for allowing the push rod to extend through the orifice element and contact the poppet to allow the push rod to move the poppet relative to the orifice element to open and close a gap between a top surface of the poppet and a bottom surface of the orifice element. The orifice element also includes a plurality of vertical flow channels extending from a bottom surface of the orifice element, through the orifice element, to a top surface of the orifice element. The vertical flow channels of the orifice element are axially misaligned with the vertical flow channels of the poppet to prevent gas from flowing through the orifice element when the gap between the top surface of the poppet and the bottom surface of the orifice element is closed.

Another aspect may be characterized as a control valve that includes a valve cavity including an inlet port and an outlet port. A poppet disposed within the valve cavity includes a plurality of vertical flow channels, and a bottom surface of the poppet faces the inlet port. An orifice element disposed within the valve cavity between the poppet and the outlet port includes means for moving a gas vertically and horizontally through the orifice element; means for moving the gas along a top surface of the orifice element; and means for moving the poppet relative to the orifice element to open and close a gap between a top surface of the poppet and a bottom surface of the orifice element to control a flow of the gas through the control valve.

DETAILED DESCRIPTION

Figure 1A:
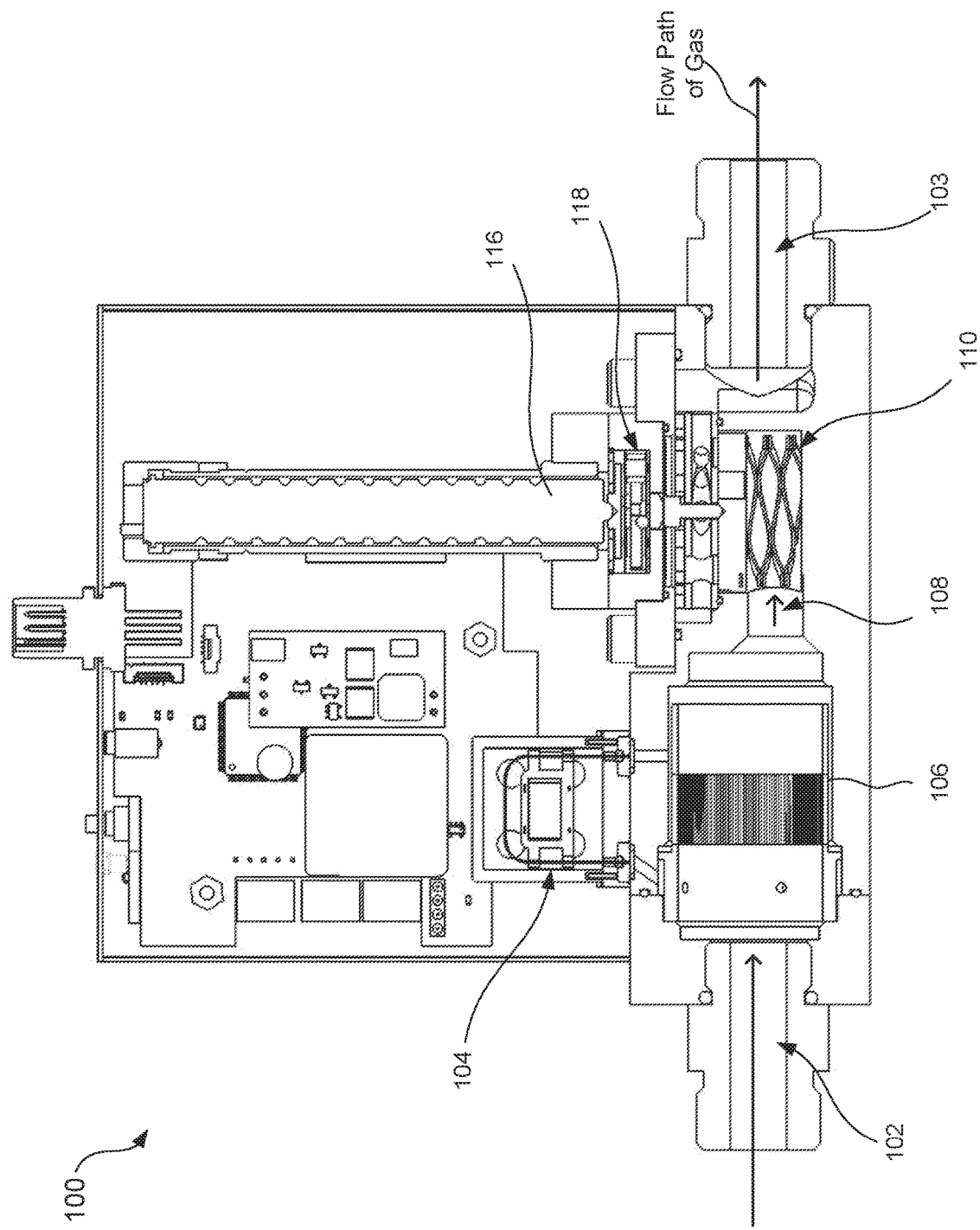
FIG. 1A is a front sectional view of a mass flow controller.

Aspects of the present invention include unique valve designs to be used in mass flow controllers that require high flow rate at relatively low inlet pressure and/or differential pressure. For example, designs disclosed herein allow flow rates greater than 100 SLM and up to about 500 SLM with much lower inlet pressure and valve span than prior art implementations. Other aspects enable use in ultra-low differential pressure applications where higher flows are needed with differential pressures less than 10 pound-force per square inch (psi) (69 kPa).

Another aspect of valves disclosed herein is an increase in an open area for flow while still maintaining a small footprint, and allowing a much smaller valve span than prior designs. For example, an alternating pattern of inflow and outflow paths are used to decrease the pressure drop across the valve surface and increase a flow coefficient (Cv) of the valve to be very close to 1 in some implementations.

Yet another aspect is a high flow rate valve that may be implemented in a 1.5 inch (3.8 centimeter) footprint. Some implementations disclosed herein use one set of alternating inlet/outlet flow paths to achieve 200 SLM of nitrogen flow within the 1.5 inch (3.8 centimeter) footprint. This design allows the full-scale flow of nitrogen down to a differential pressure of 15 psi (103 kPa). For higher flow rates or lower pressure differentials, the number of channels and flow paths are increased.

Aspects of many implementations enable a lower inlet pressure than prior designs to provide a high flow level of gas with a low pressure. In the context of receiving natural gas from a supplier, for example, pressure is typically very low (e.g., 5 psi (35 kPa) or as low as 2.5 psi (17 kPa)) while there is a desire for flow rates of 100 SLM, 200 SLM, or more.

Figure 1B:
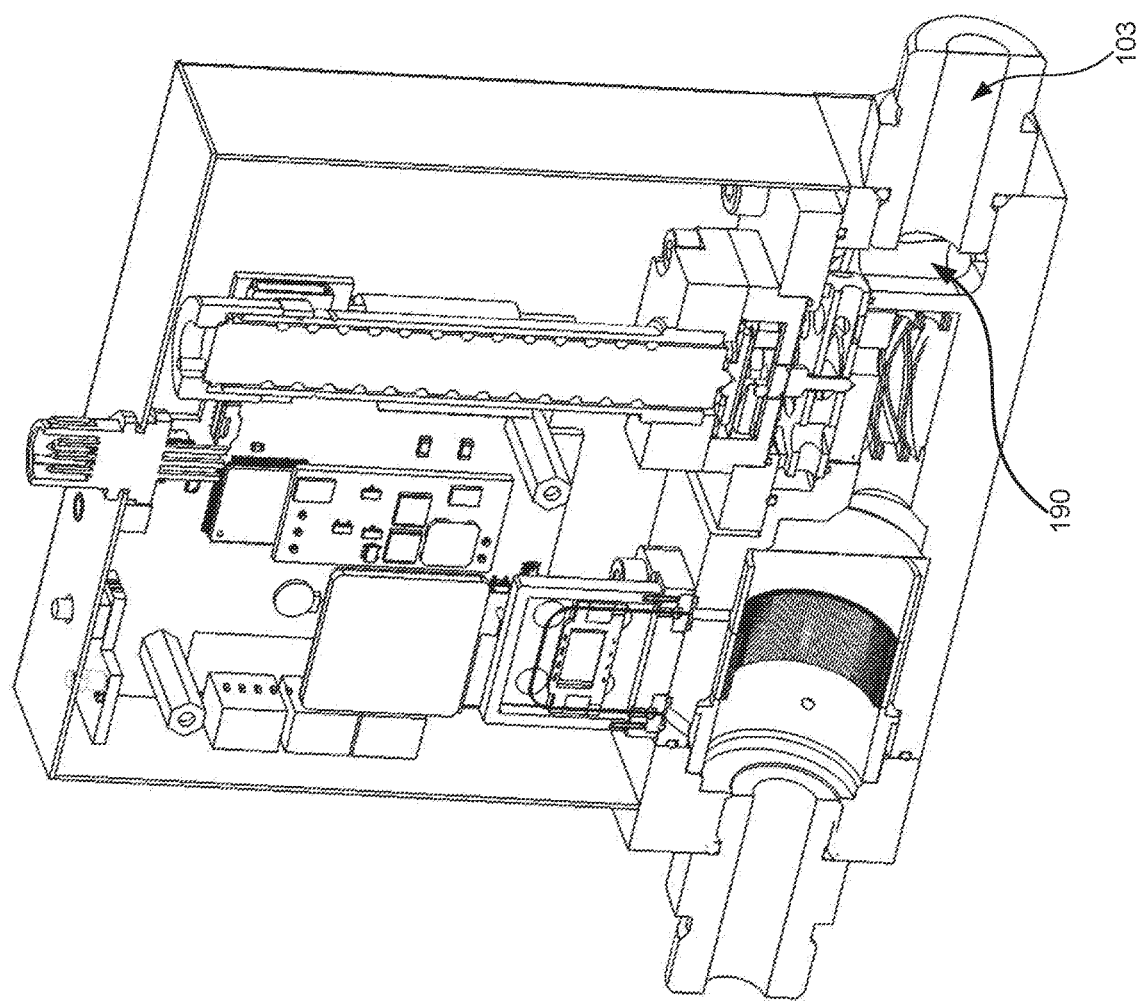
FIG. 1B is an isometric section view of the mass flow controller of FIG. 1A.
Figure 1C:
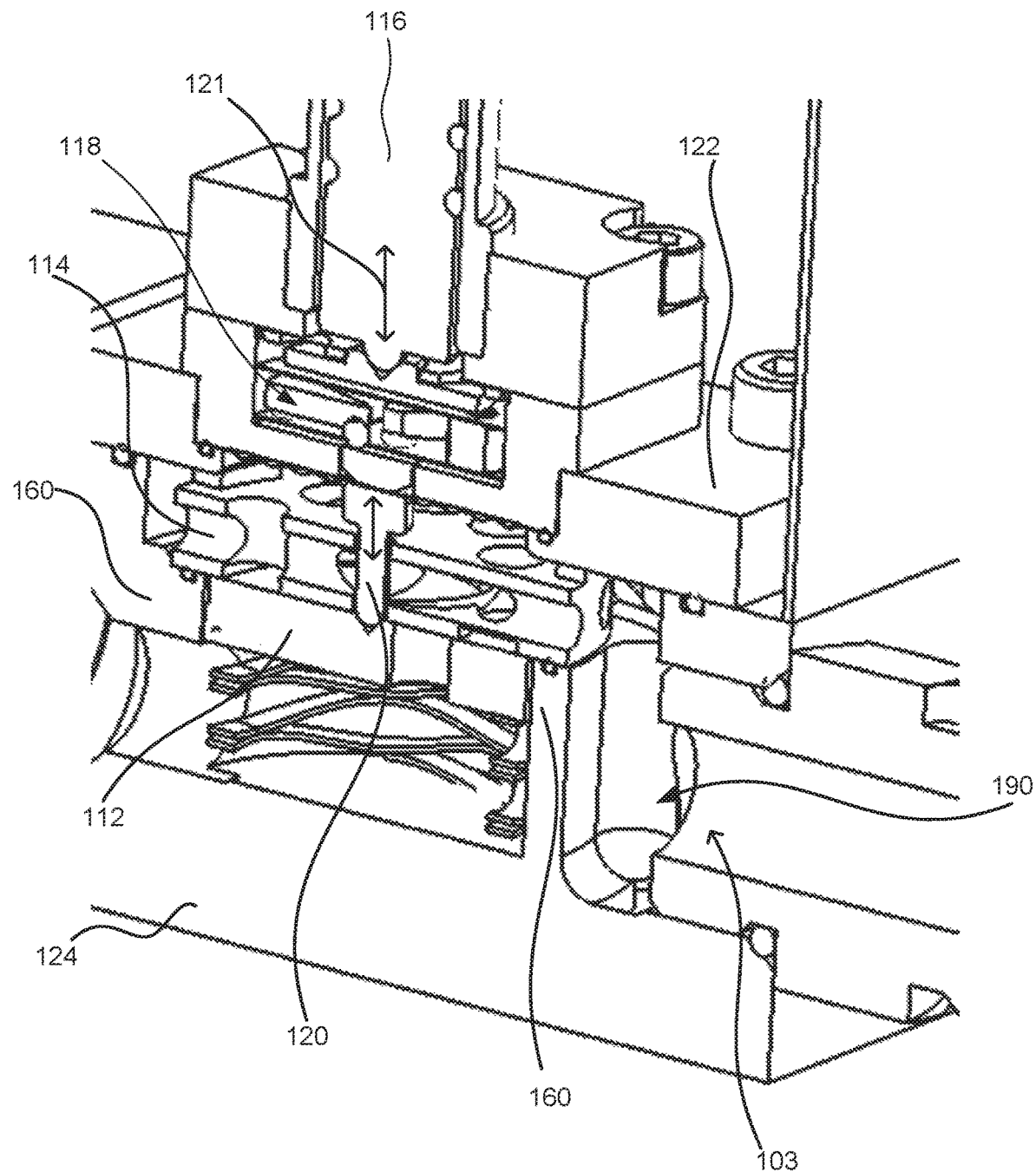
FIG. 1C is an exploded isometric view of a valve section of the mass flow controller of FIGS. 1A and 1B.

Referring first to FIGS. 1A, 1B, and 1C, shown are a front sectional view; an isometric section; and an exploded isometric view of a valve section, respectively, of an exemplary mass flow controller (MFC) 100. In operation, a gas comes in a gas inlet 102 of the mass flow controller 100 and a small portion of the gas flow flows through a sensor 104 while a majority of the gas flow passes through a bypass portion 106 of the mass flow controller 100. The gas that flows through the sensor 104 rejoins the gas that flows through the bypass portion 106 just upstream 108 of a valve portion where a multi-coil wave spring 110 is positioned below a poppet 112, which is moveably positioned below an orifice element 114. When the valve is open, the gas flows through the poppet 112, the orifice element 114, an elongate exit channel 190, and then out an outlet port 103.

Disclosed herein are two different embodiments of a poppet-orifice set. In a first embodiment described with reference to FIGS. 2-4, the orifice element 114 and the poppet 112 each include a single channel-ring wherein the single channel-ring in each of the poppet 112 and orifice element 114 is made up of channels arranged in a circular pattern that are equidistant from a center of the corresponding poppet 112 and orifice element 114. In a second embodiment described with reference to FIGS. 5-8, each of the poppet 512 and the orifice element 514 include multiple channel-rings, wherein each channel-ring in each of the poppet 512 and orifice element 514 is made up of channels arranged in a circular pattern that are equidistant from a center of the corresponding poppet 512 and orifice element 514. It should be noted that the MFC 100 depicted in FIGS. 1A-1C includes a single channel-ring poppet 112 and orifice element 114, but the multiple-channel ring poppet 512 and orifice element 514 also fit, and operate within, the MFC 100 in much the same way as the single channel-ring poppet 112 and orifice element 114.

Also disclosed herein are two different embodiments of a base for the MFC 100. In a first exit channel embodiment (depicted in FIGS. 1-C and 9A and 9B), the base of the MFC 100 includes an expanded exit channel 190 is utilized to further enhance low-pressure, high-flow, aspects of the MFC 100. In a second exit channel embodiment (depicted in FIGS. 4 and 5), the base of the MFC 100 includes an exit channel 495 that is not expanded.

As shown, an actuator (depicted as a piezo actuator) 116 is coupled via a motion booster 118 to a push rod 120, and the push rod 120 mates with a recessed portion in a center of the poppet 112. To allow gas to flow through the valve, a piezo portion of the actuator 116 expands downward, along a vertical axis 121, and a displacement of the actuator 116 along the vertical axis 121 is increased by the motion booster 118 which imparts an increased amount of displacement on the push rod 120 to force the poppet 112 downward, and hence, force the spring 110 to compress. For example, the motion booster 114 may transform 100 microns of displacement of the actuator 116 into 400 microns of displacement at the push rod 120 and poppet 112. When pushed downward, the poppet 112 separates from the orifice element 114 (which in many embodiments is fixed in place relative to the body of the MFC 100) to open a gap between the poppet 112 and the orifice element 114 to enable gas to flow through flow channels within the poppet 112 and a flow channel formed around an edge of the poppet 112.

When the valve is closed (as depicted in FIGS. 1A, 1B, 1C), a top surface of the poppet 112 is in connection with a bottom surface of the orifice element 114, which creates a seal that prevents the gas from flowing through the valve. More specifically, each of the poppet 112 and the orifice element 114 have flow channels, but the flow channels are axially misaligned so that when the poppet 112 and orifice element 114 are joined together, the flow channels between the poppet 112 and orifice element 114 are closed. As discussed further herein, in some embodiments, the top surface of the poppet 112 and the bottom surface of the orifice element 114 are planer (e.g., in some embodiments, neither the top surface of the poppet 112 nor the bottom surface of the orifice 114 element include grooves), which is easier to manufacture than some prior art designs.

As shown, the spring 110 may be a coil spring with approximately the same diameter as the poppet 112; thus, providing support to the outer portions of the poppet 112 to prevent the poppet 112 from tilting, and the spring 110 may be relatively stiff to help to reduce vibrations. Applicant has found that at low inlet pressures (e.g., 2.5 psi (17 kPa)), vibrations are less of a concern than applications where there is a high inlet pressure.

As shown in FIG. 1C, the orifice element 114 itself acts as a support for an upper body portion 122 of the MFC 100. More specifically, the orifice element 114 is disposed between the upper body portion 122 and a lower body portion 124 of the MFC 100, and as discussed with reference to FIGS. 2A-2C and 6A-6C, the orifice element 114 includes support ridges 230, 630 as structural members that are discontiguous and extend above a surface of the orifice element 114 to form surface flow passages for gas to flow above the orifice element 114; thus, providing additional volume to enhance flow rate while reducing a pressure differential across the MFC 100.

The poppets 112, 512, 712 disclosed herein also have structural aspects that are discontiguously configured to allow gas flow while serving a structural purpose. More specifically, as discussed with reference to FIGS. 3A-3E and 7A-7E the two poppet 112 embodiments each include side ridges 360, 760 that help to position the poppets 112, 512, 712 between valve side walls of the MFC 100 where that poppets 112, 512, 712 travel vertically up and down.

Figure 2A:
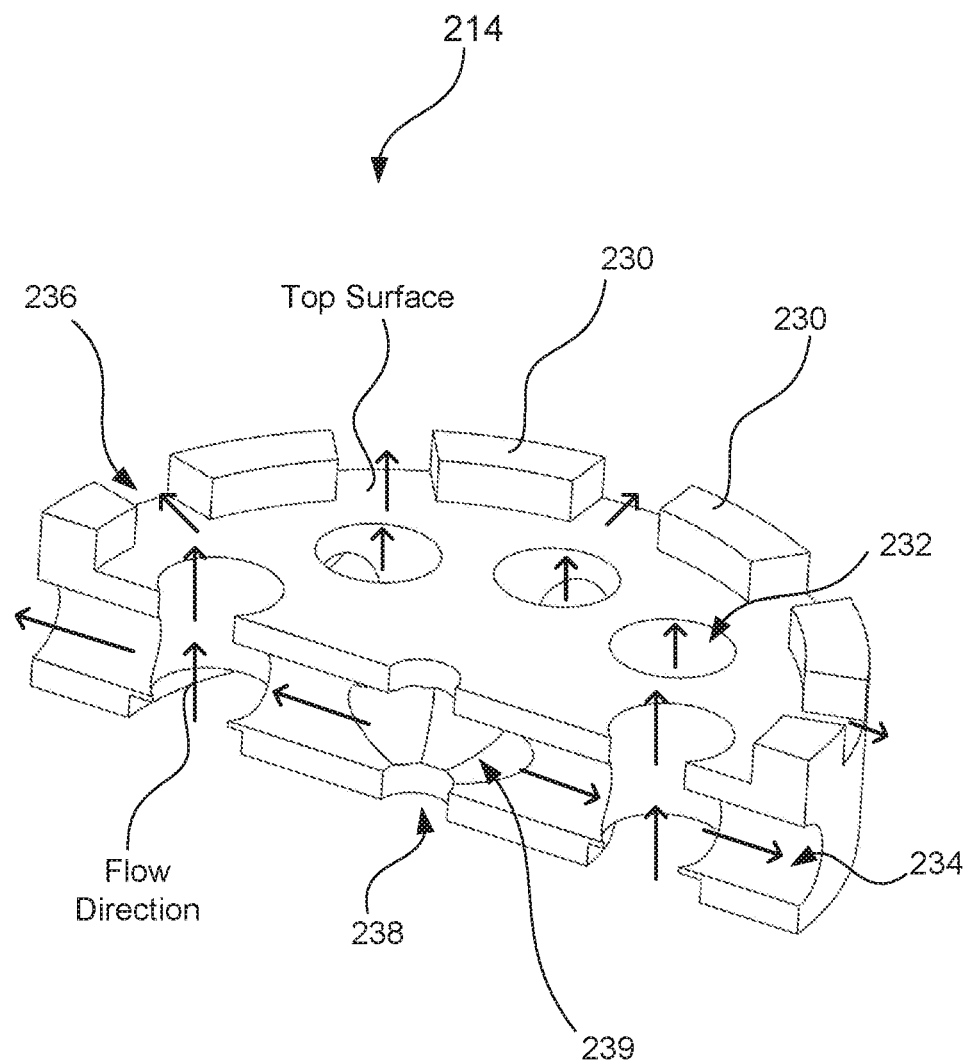
FIG. 2A is an isometric section view of a first embodiment of an orifice element.
Figure 2B:
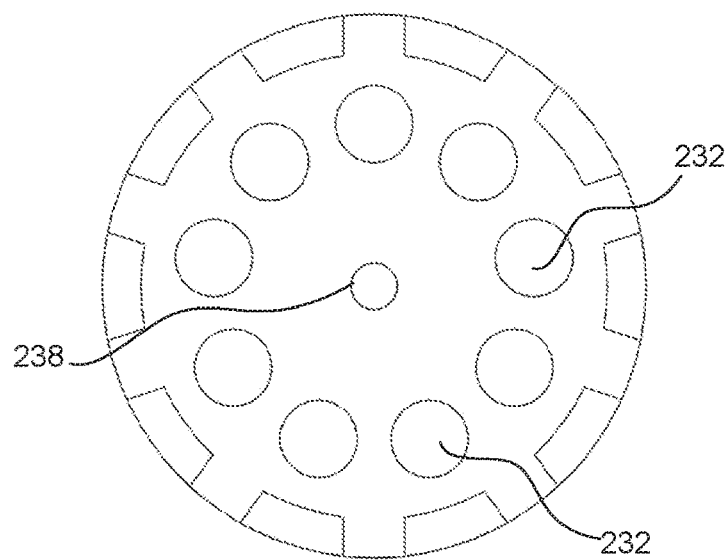
FIG. 2B is a top view of the orifice element depicted in FIG. 2A.
Figure 2C:
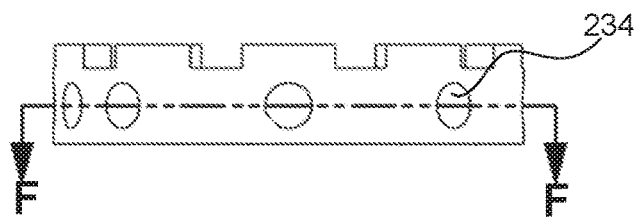
FIG. 2C is a side view of the orifice element depicted in FIGS. 2A and 2B.
Figure 2D:
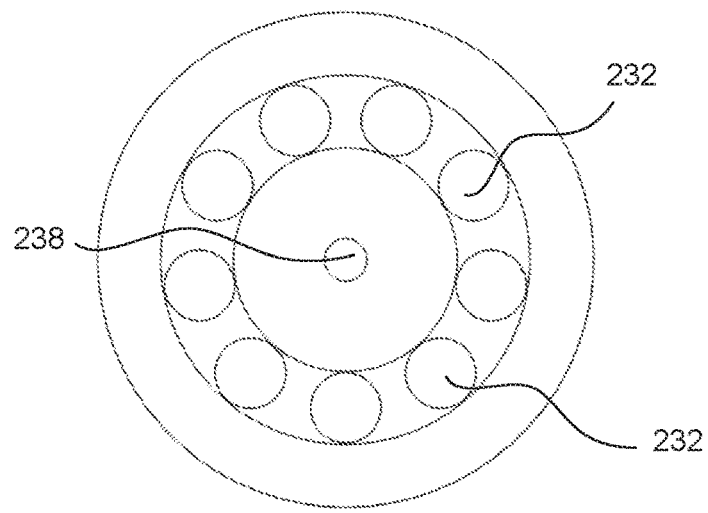
FIG. 2D is a bottom view of the orifice element of FIGS. 2A, 2B, and 2C.

Referring next to FIGS. 2A, 2B, 2C, 2D, and 2E shown is a single channel-ring orifice element 214 depicted by an isometric section; a top view; a side view; bottom view; and sectional view respectively. Aspects of the single channel-ring orifice element 214 include support ridges 230, vertical flow channels 232, and horizontal flow channels 234. FIG. 2A is shown with arrows depicting a direction of flow from a bottom of the orifice element 214 upward through the vertical flow channels 232 and then horizontally through either horizontal flow channels 234 or along surface flow passages 236 between the support ridges 230 of the orifice element 214.

Figure 2E:
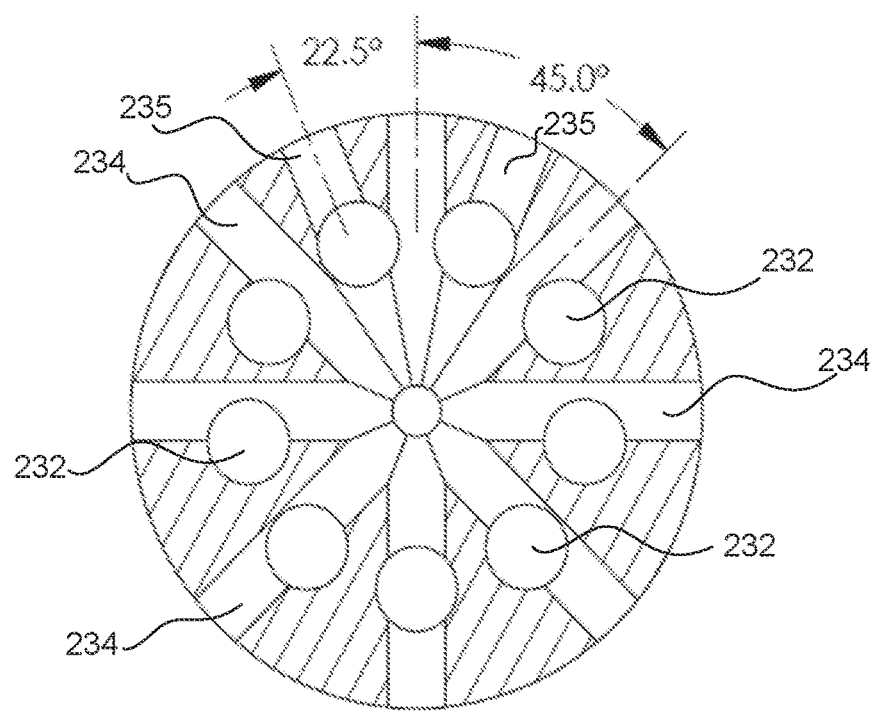
FIG. 2E is a sectional view of the orifice depicted in FIGS. 2A-2D along section F-F shown in FIG. 2C.

Also shown through a center of the single channel-ring orifice element 214 is a push rod slot 238 for the push rod 120 to move through. Also shown is a push rod cavity 239 that is formed within the orifice element 214. The push rod cavity 239 has a larger diameter than the push rod slot 238 forming a volume that enables gas to flow around the push rod 120. As shown, the horizontal flow channels 234 may intersect at the push rod cavity 239. In addition, as shown in FIG. 2E, the distribution of horizontal flow channels may be asymmetric. More specifically, there may be more horizontal flow channels 234 in a first 180-degree sector of a circular section of the orifice element 214 than a second 180-degree sector of the orifice element 214. In the depiction of the orifice element 214 in FIG. 2E, the upper-half of the orifice element 214 is an example of the first 180-degree sector and the lower-half of the orifice element 214 is an example of the second 180-degree sector. As shown, the horizontal flow channels 234 may generally be spaced 45 degrees apart, and in the upper-half of the orifice element 214 there may be additional horizontal flow channels 235 that are spaced 22.5 degrees apart from an adjacent horizontal flow channel 234. When implemented within a valve cavity of the mass flow controller 100 the first 180-degree sector of the orifice element 214 (with a higher concentration of horizontal flow channels 234) may face the outlet port 103 to provide additional flow-channel-volume in the direction of the outlet port 103. In other implementations the distribution of horizontal flow channels 234 may be symmetrical and equally spaced about the orifice element 214.

Referring next to FIGS. 3A, 3B, 3C, 3D, and 3E, shown is a single channel-ring poppet 312 depicted by an isometric view; an isometric section; a top view; a side view; and a bottom view, respectively. Aspects of the single channel-ring poppet 312 include vertical flow channels 350 and the recessed portion 352 in the center of the poppet (to receive the push rod), which does not extend through the poppet 312 to the bottom.

Other aspects of the single channel-ring poppet 312 include a smooth top surface 354 and a smooth bottom surface 356 without grooves. As shown, the vertical flow channels 350 in the single channel-ring poppet 312 are arranged in a circular pattern that is equidistant from the recessed portion 352 of the poppet 312 (which is a center of a top surface 354 of the poppet 312). And as discussed above, the vertical flow channels 350 are disposed to be axially offset from the vertical flow channels 232 of the orifice element 214 to prevent flow of the gas when the bottom of the orifice element 214 is placed in connection with the top of the poppet 312.

Figure 3A:
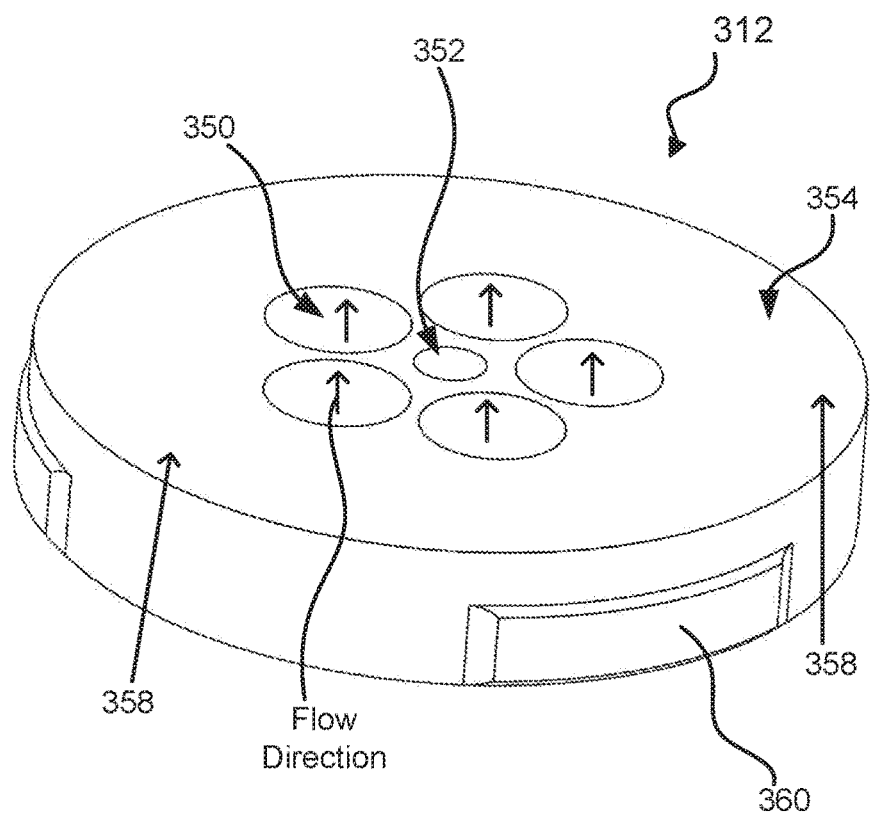
FIG. 3A is an isometric view of a first embodiment of a poppet.
Figure 3B:
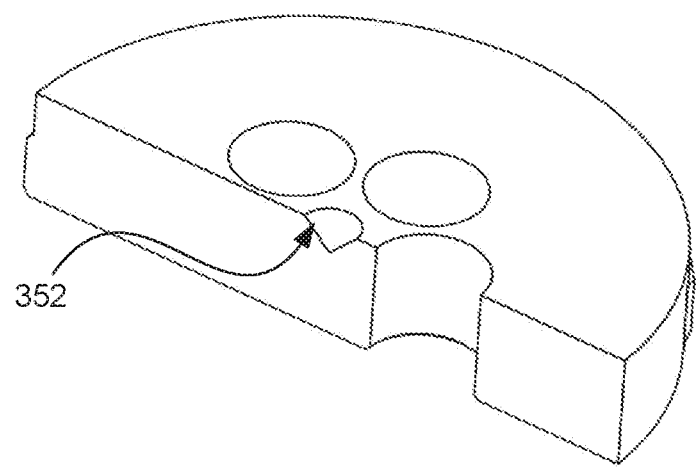
FIG. 3B is an isometric section view of the poppet of FIG. 3A.
Figure 3C:
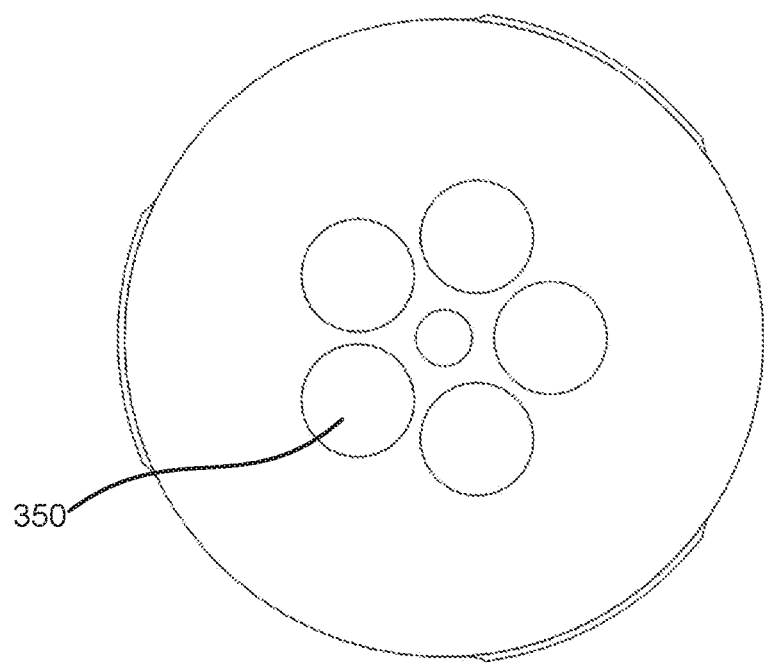
FIG. 3C is a top view of the poppet depicted in FIGS. 3A and 3B.
Figure 3D:
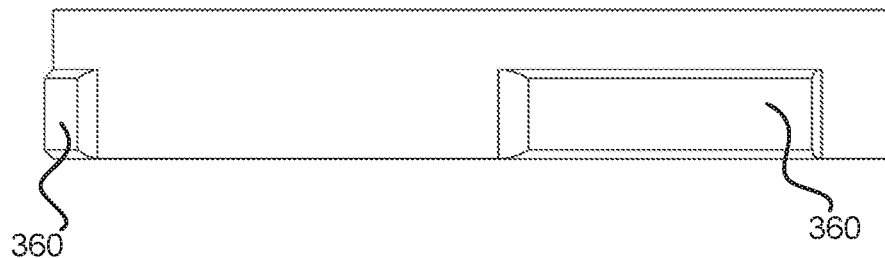
FIG. 3D is a side view of the poppet depicted in FIGS. 3A, 3B, and 3C.
Figure 3E:
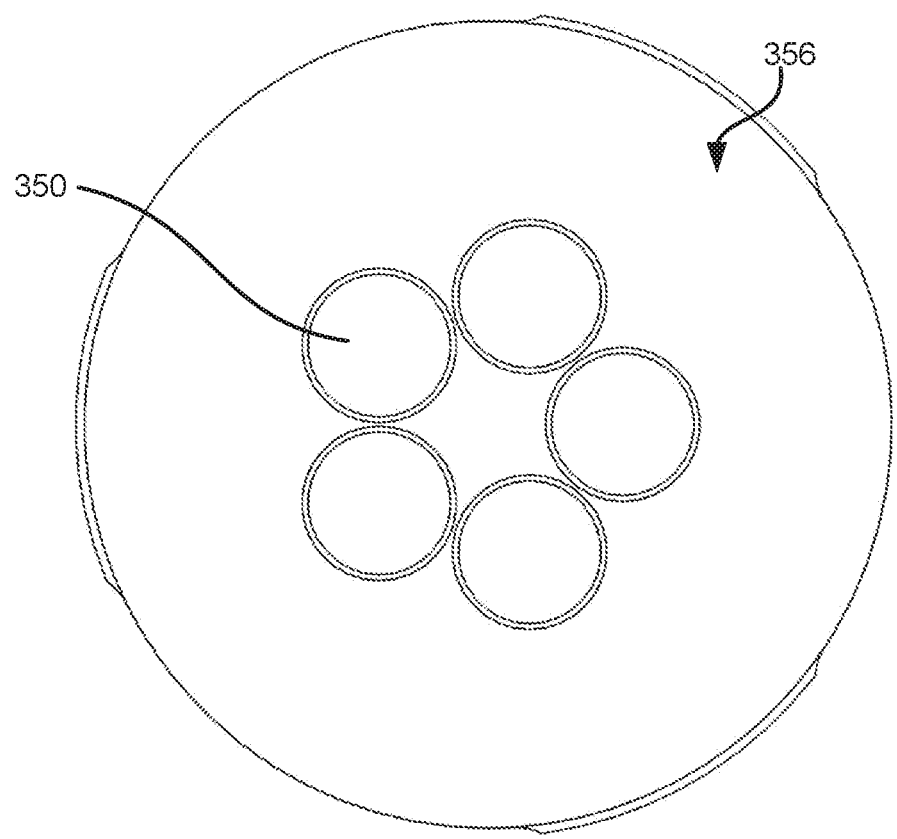
FIG. 3E is a bottom view of the poppet depicted in FIGS. 3A, 3B, 3C, and 3D.

FIG. 3A also depicts edge flow paths 358 that are formed between the side ridges 360 of the single channel-ring poppet 312. As discussed above, the side ridges 360 position the poppet 312 between the valve channel walls 160, and the gaps between the side ridges 360 form the edge flow paths 358 to allow gas to flow between the valve channel walls 160 and the poppet 312.

Figure 4:
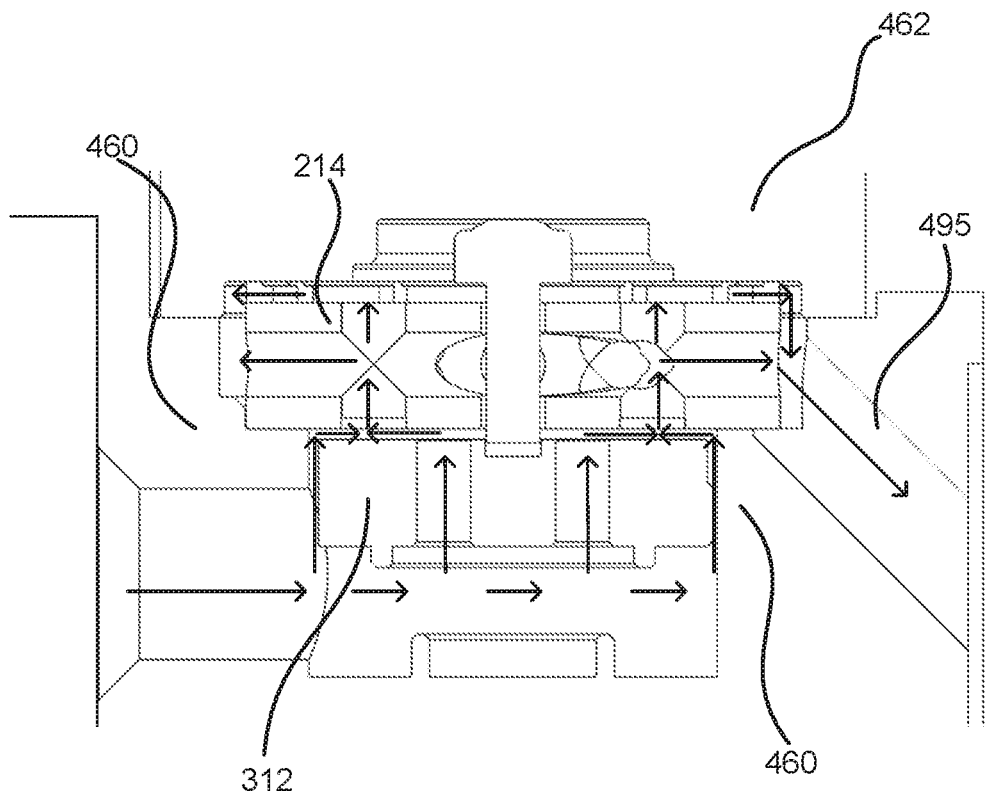
FIG. 4 is a sectional view of a valve including the orifice element of FIGS. 2A-2D and the poppet of FIGS. 3A-3E.

Referring to FIG. 4, shown is a sectional view of the valve when realized by the single channel-ring poppet 312 and single channel-ring orifice element 214. The state of the valve depicted in FIG. 4 is open to show the flow paths for the gas between the poppet 312 and the orifice element 214 and along the edges of the poppet 312. As shown, the valve body includes valve channel walls 460 and an upper body 462. In this embodiment, an exit channel 495 (that provides a path between the orifice element 214 and an outlet port) is not expanded; thus, the exit channel 495 differs from the expanded exit channel 190 described with reference to FIG. 1. But the single channel-ring poppet 312 and single channel-ring orifice element 214 can fit within both the base depicted in FIGS. 1A-1C and the base depicted in FIG. 4.

Figure 5:
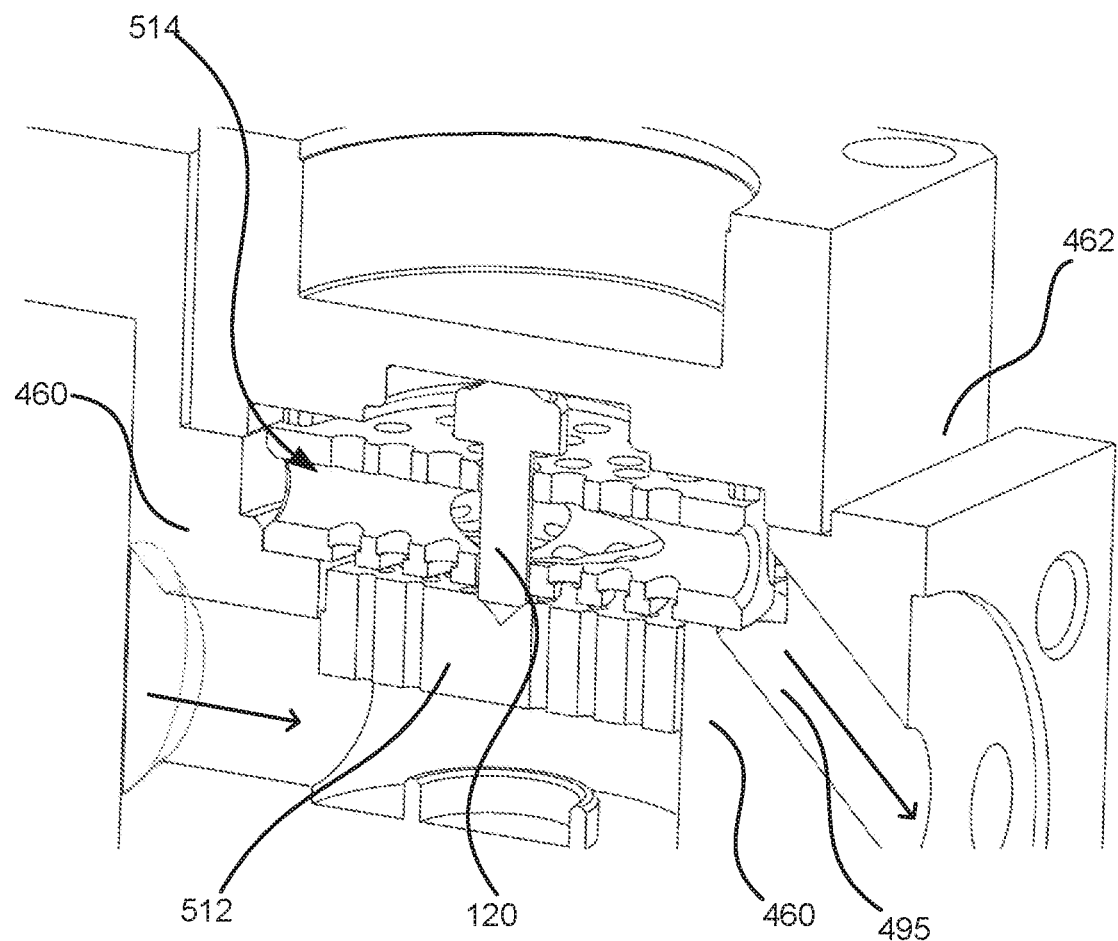
FIG. 5 is an isometric section view of a valve that includes a second embodiment of an orifice element and a second embodiment of a poppet.

Referring to FIG. 5, shown is an isometric section view of the valve realized by the second embodiment of the poppet-orifice set: a multiple channel-ring poppet 512 and multiple channel-ring orifice element 514. As shown, the valve body depicted in FIG. 5 (including the valve channel walls 460 and the upper body 462) is substantially the same as the valve body depicted in FIG. 4 where a single channel-ring poppet-orifice set is depicted. So, the multiple channel-ring poppet 512 and orifice element 514 may operate within substantially the same structural confines as the single channel-ring poppet-orifice set.

Figure 6A:
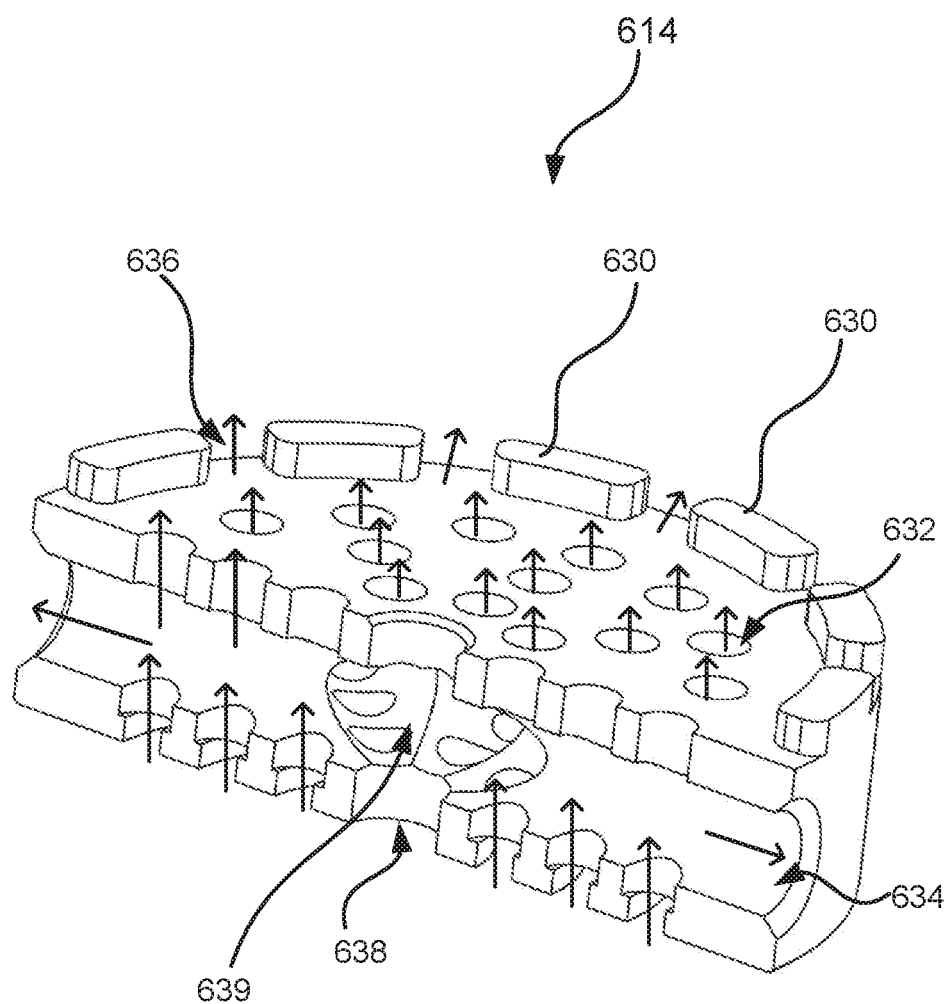
FIG. 6A is an isometric section view of the second embodiment of the orifice element depicted in FIG. 5.
Figure 6B:
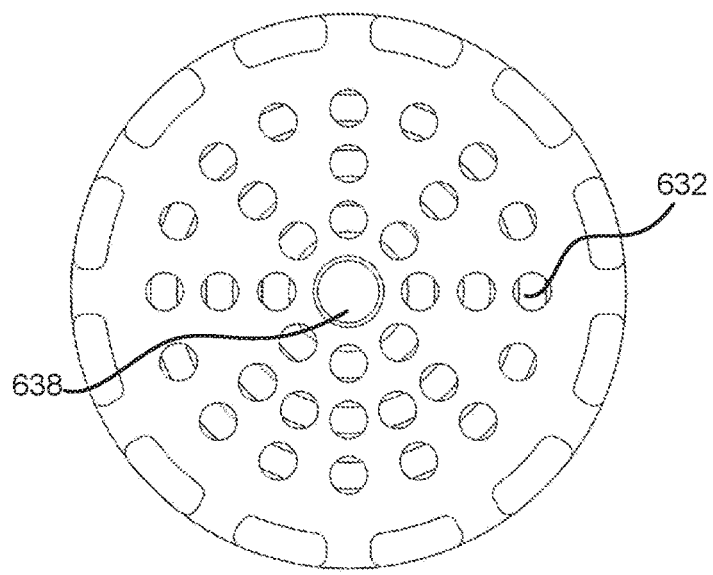
FIG. 6B is a top view of the orifice element depicted in FIGS. 5 and 6A.
Figure 6C:
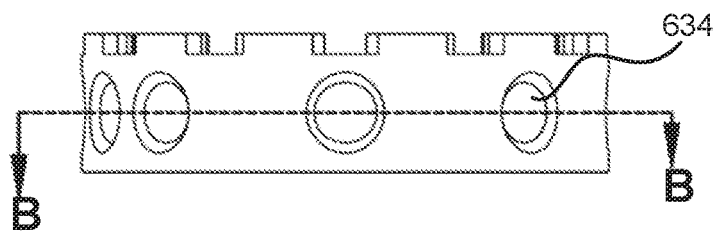
FIG. 6C is a side view of the orifice element depicted in FIGS. 5, 6A, and 6B.
Figure 6D:
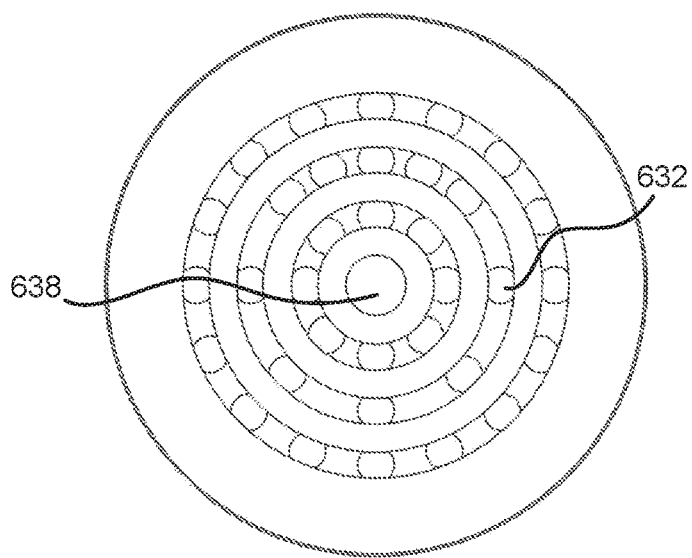
FIG. 6D is a bottom view of the orifice element depicted in FIGS. 5 and 6A-6C.

Referring next to FIGS. 6A, 6B, 6C, and 6D, shown is a multiple channel-ring orifice element 614 depicted by an isometric section; a top view; a side view; and a bottom view, respectively. Aspects of the multiple channel-ring orifice element 614 include support ridges 630, vertical flow channels 632, and horizontal flow channels 634. FIG. 6A is shown with arrows depicting a direction of flow from a bottom of the orifice element 614 upward through the vertical flow channels 632 and then horizontally through either horizontal flow channels 634 or along surface flow passages 636 between the support ridges 630 of the orifice element 614. Also shown is a push rod slot 638 and a push rod cavity 639.

Figure 6E:
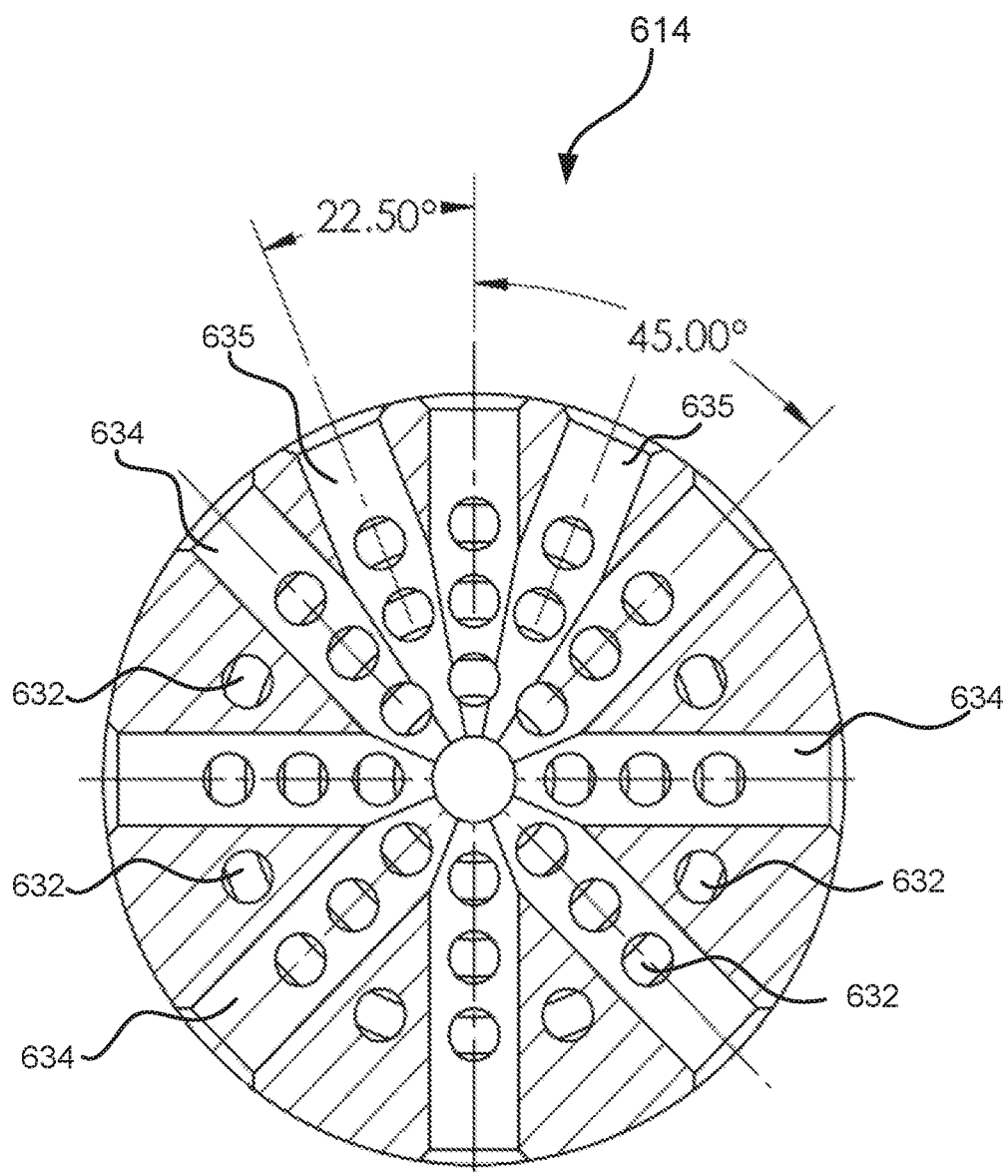
FIG. 6E is a sectional view of the orifice depicted in FIGS. 6A-6D along section B-B of the orifice depicted in FIG. 6C.
Figure 7A:
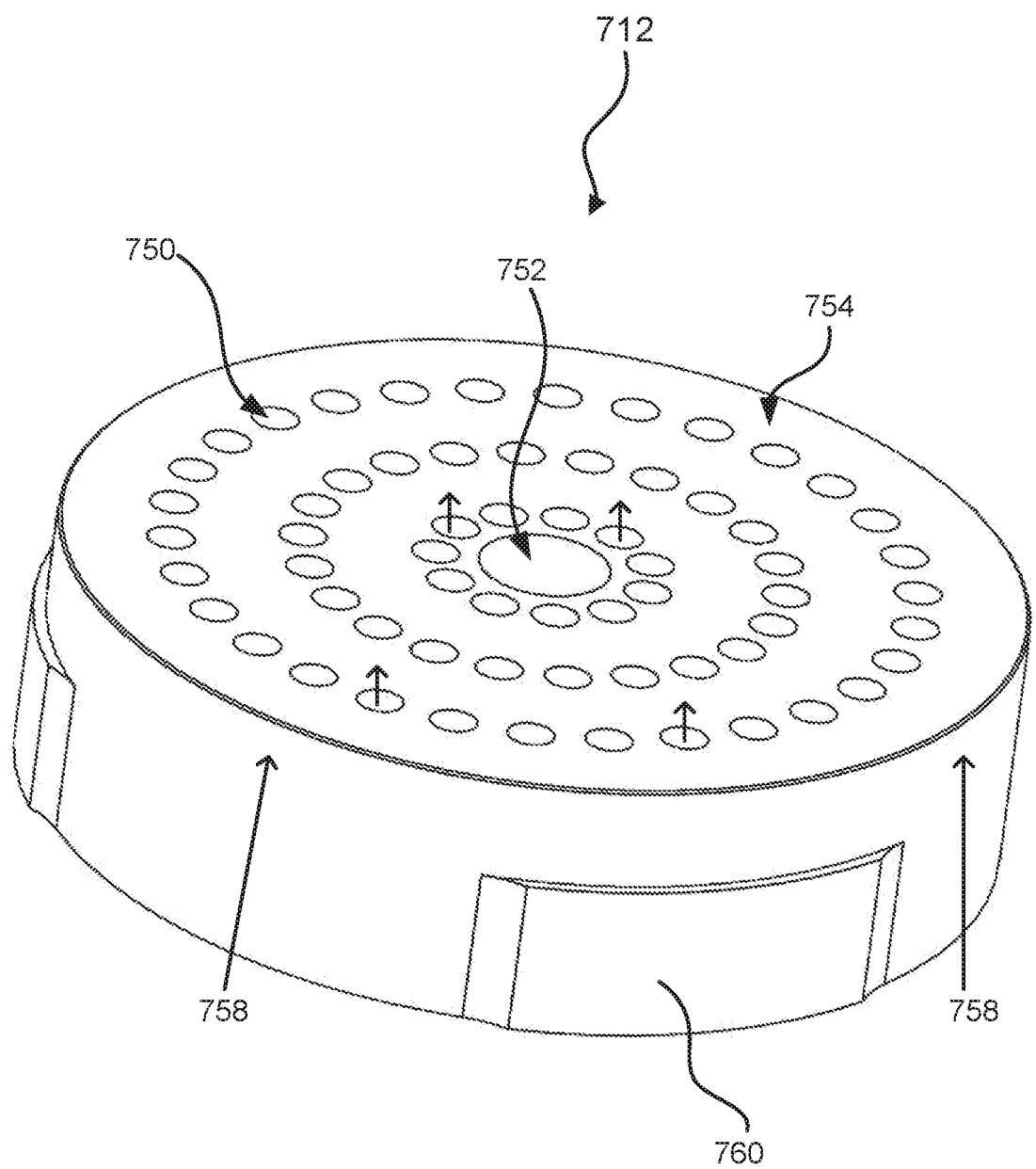
FIG. 7A is an isometric view of the second embodiment of the poppet depicted in FIG. 5.
Figure 7B:
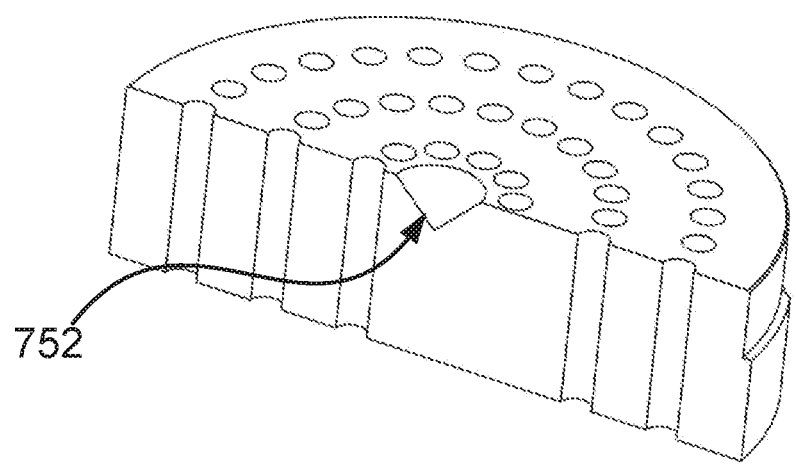
FIG. 7B is an isometric section view of the poppet of FIGS. 5 and 7A.
Figure 7C:
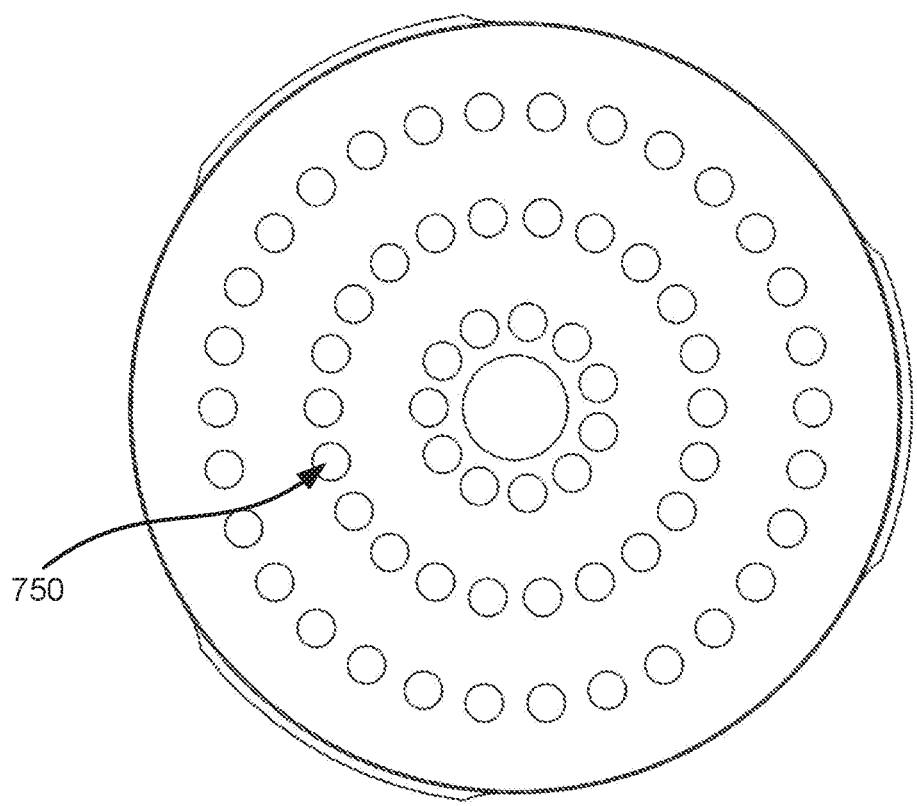
FIG. 7C is a top view of the poppet depicted in FIGS. 5, 7A, and 7B.
Figure 7D:
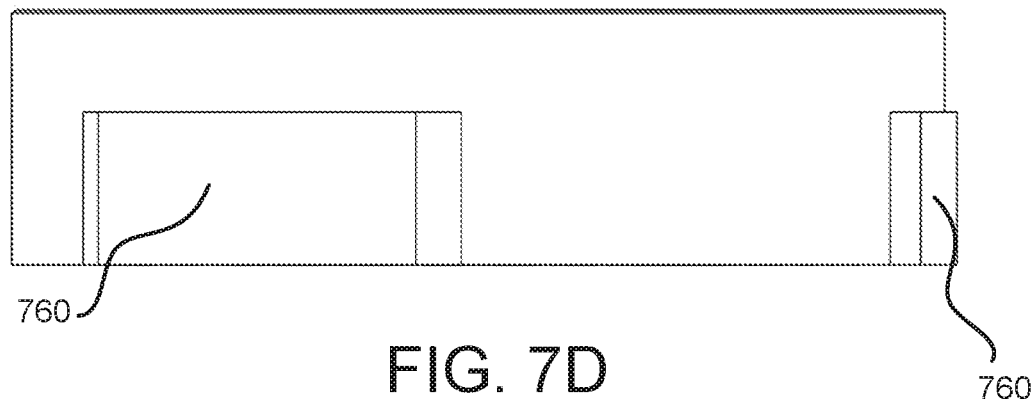
FIG. 7D is a side view of the poppet depicted in FIGS. 5 and 7A-7C.
Figure 7E:
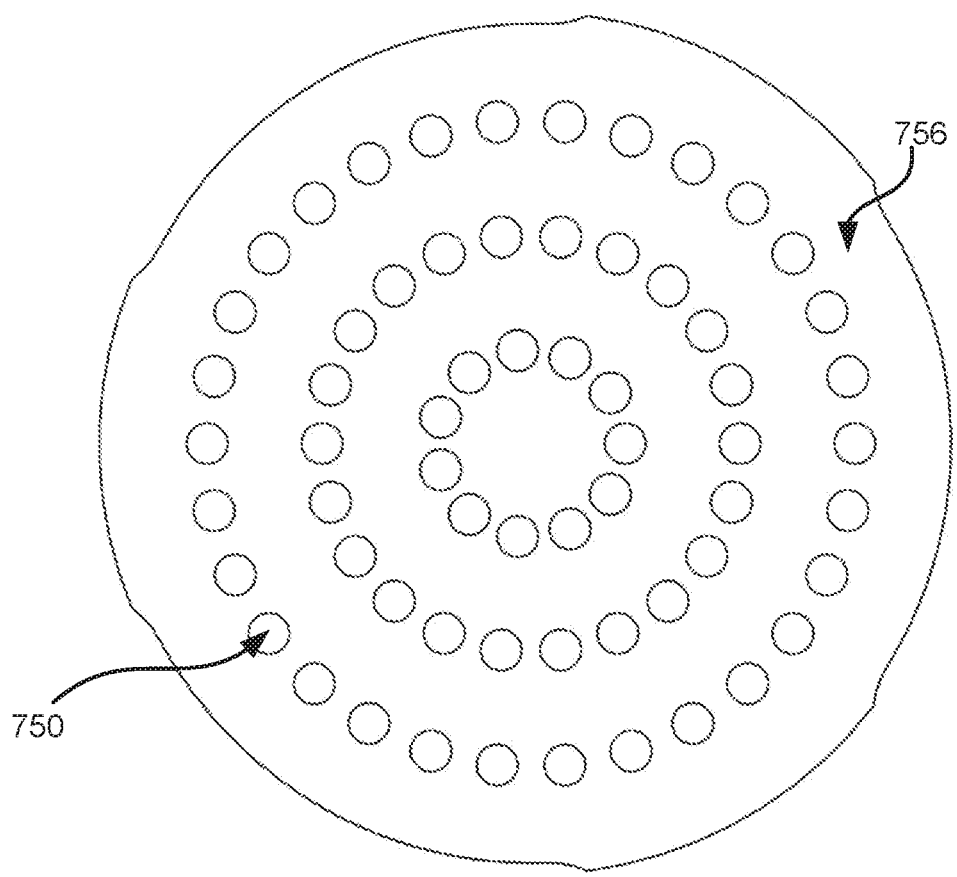
FIG. 7E is a bottom view of the poppet depicted in FIGS. 5 and 7A-7D.

As shown in FIG. 6E, the distribution of horizontal flow channels 634 in the orifice element 614 may be asymmetric (in much the same way as the orifice element 214 previously described with reference to FIGS. 2A-2E) so that more horizontal flow channels 634 are provided in a first 180-degree sector of a circular section of the orifice 614 facing the outlet port 103 than a second 180-degree sector of the orifice 614. The orifice 614, however, has more horizontal flow channels 634 than the orifice element 214 described with reference to FIGS. 2A-2E. In addition, the orifice element 614 includes more vertical flow channels 632 than the orifice element 214, and each horizontal flow channel 634 of the orifice element 614 is intersected by at least two vertical flow channels 632. In other implementations of the orifice element 614, the distribution of horizontal flow channels 634 may be symmetrical and equally spaced about the orifice element 214.

Referring next to FIGS. 7A, 7B, 7C, 7D, and 7E, shown is a multiple channel-ring poppet 712 depicted by an isometric view; an isometric section; a top view; a side view; and a bottom view, respectively. Aspects of the multiple channel-ring poppet 712 include vertical flow channels 750 and the recessed portion 752 in the center of the poppet 712 (to receive the push rod), which does not extend through the poppet 712 to the bottom.

Other aspects of the multiple channel-ring poppet 712 include a smooth top surface 754 and a smooth bottom surface 756 without grooves. As shown, each of the multiple rings of the vertical flow channels 750 in the multiple channel-ring poppet 712 are arranged in a circular pattern that is equidistant from the recessed portion 752 of the poppet 712 (which is a center of the top surface 754 of the poppet 712). And as discussed above, the vertical flow channels 750 are disposed to be axially offset from the vertical flow channels 632 of the multiple channel-ring orifice element 614 to prevent flow when the bottom surface of the multiple channel-ring orifice element 614 is placed in connection with the top of the multiple channel-ring poppet 712.

Figure 8:
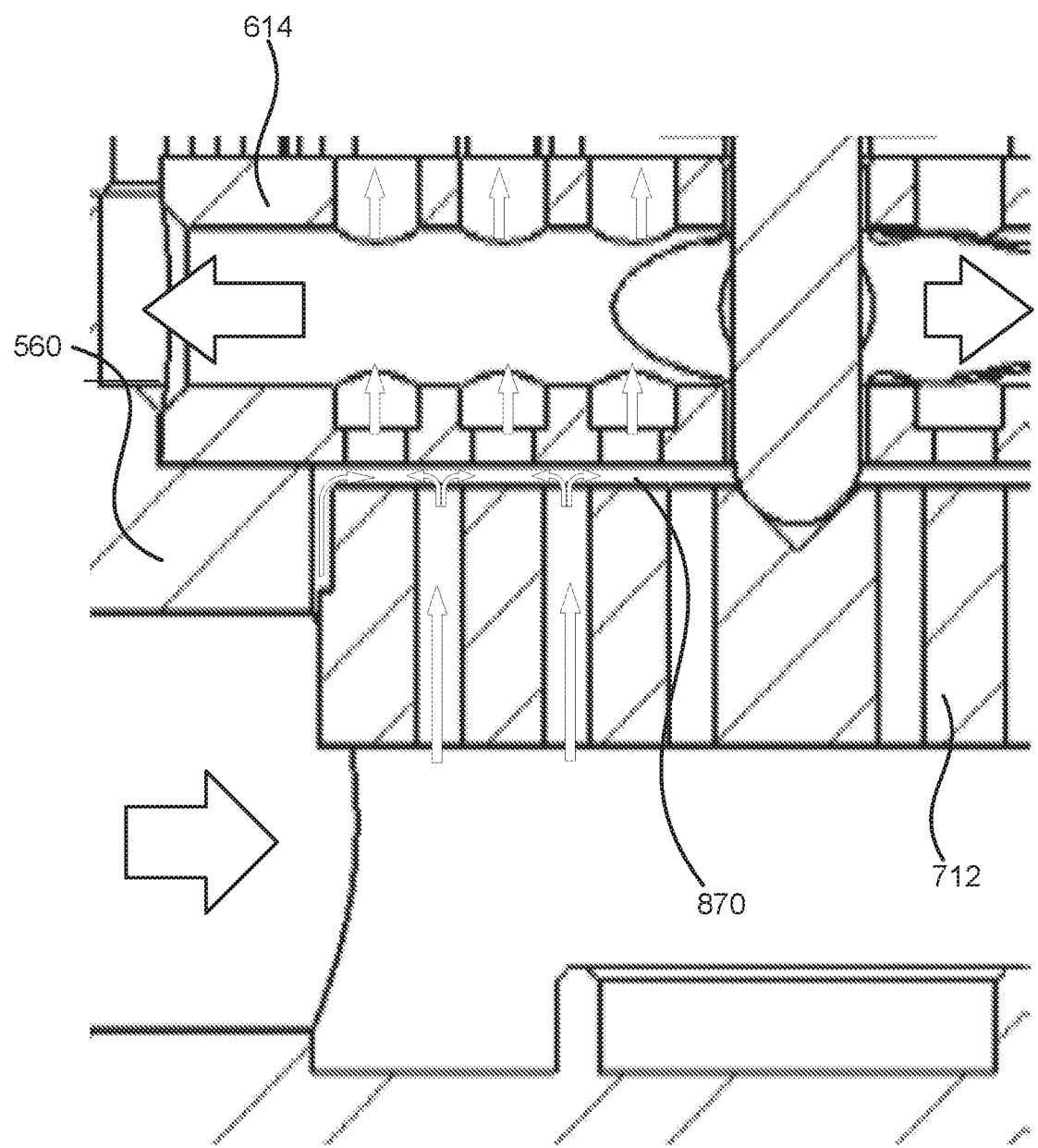
FIG. 8 is a sectional view of the valve depicted in FIG. 5 that includes the orifice element depicted in FIGS. 6A-6D and the poppet depicted in FIGS. 7A-7F.

Referring next to FIG. 8, shown is a sectional view of the valve when realized by the multiple channel-ring poppet 712 and multiple channel-ring orifice element 614. The state of the valve depicted in FIG. 8 is open to show the flow paths for the gas including a gap 870 between the multiple channel-ring poppet 712 and the multiple channel-ring orifice element 614 and along the edges of the multiple channel-ring poppet 712.

Figure 9A:
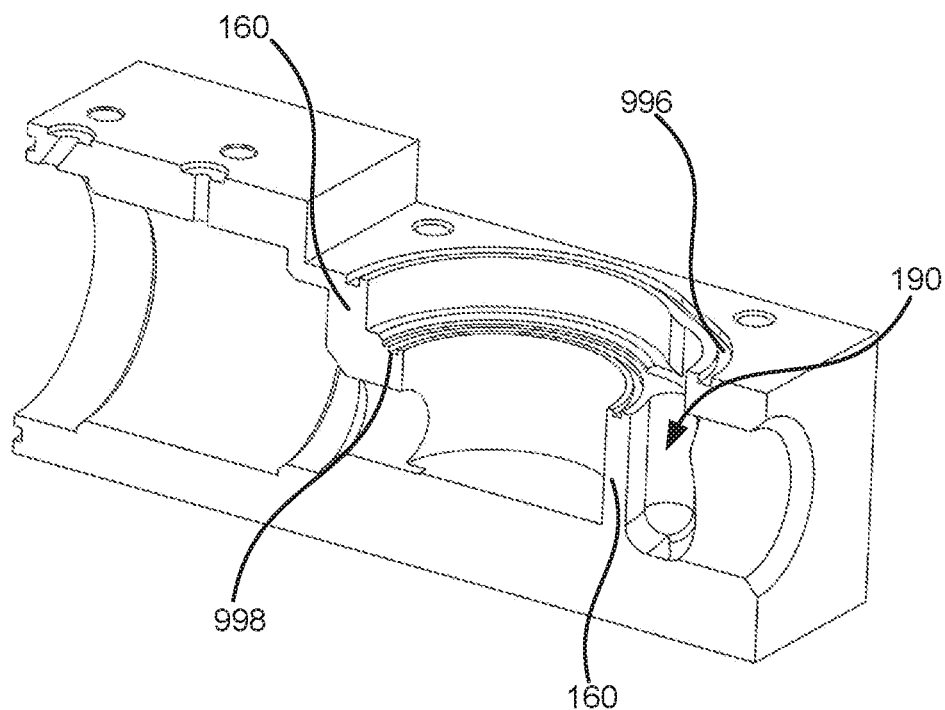
FIGS. 9A and 9B are an isometric section view and a top view, respectively, of the base depicted in FIG. 5.
Figure 9B:
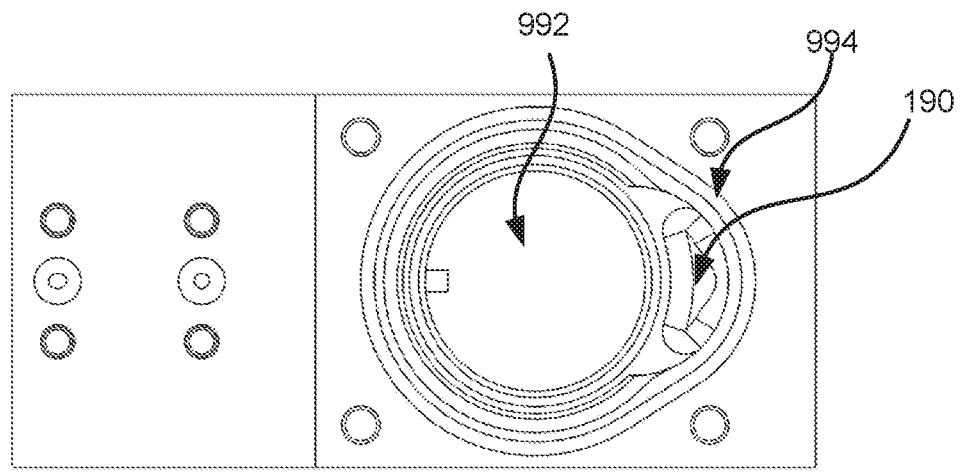

Referring next to FIGS. 9A and 9B, shown are an isometric section view and a top view, respectively, of a base of the mass flow controller (MFC) 100 with the orifice element 214, 614 and poppet 312, 712 removed. Another aspect that contributes to a low pressure drop of the MFC 100 during high flow rates is the expanded exit channel 190 of a valve cavity 992 of the base, which is depicted in FIGS. 9A and 9B. As shown, at a level where the orifice element 214, 614 rests in the MFC body, the increased size of the expanded exit channel 190 forms an elongate extension 994 of the valve cavity 992. To accommodate the expansion, a seal groove 996 is also expanded to accommodate an elongate seal ring (as opposed to prior art implementations that utilize an o-ring).

Also shown in FIGS. 9A and 9B is an o-ring seal groove 998 where an o-ring is placed, and edges of the orifice element 214, 614 rest on top of the o-ring to form a seal. Both the elongate-ring and the o-ring may be stainless steel, so a substantial amount of force is placed on the orifice element 214, 614 to create a seal on the o-ring.

Although the expanded exit channel 190 increases a size of the valve cavity 992, there remains sufficient depth in the body for threads of a standard size fitting. In some applications, the end-to-end size of the MFC 100 is a constraint (due to standardization of MFC 100 sizes); thus, the body depicted in FIGS. 9A and 9B enables the MFC 100 to remain within a standard MFC size while providing high flow with a low-pressure differential across the MFC 100. As an example, when the MFC 100 is realized with the base depicted in FIGS. 9A and 9B, the orifice element 614 described with reference to FIGS. 6A-6E, and the poppet described with reference to FIGS. 7A-7F, flow rates of 200 standard liters per minute at a differential pressure across the MFC 100 of 2.5 PSI (17 kPa) is achievable when the MFC 100 is realized with a width of 55 millimeters and a length of 192 millimeters.

In short, many aspects are disclosed herein that enable low pressure-drop across the MFC 100 at high flow rates. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed herein.

What is claimed is:

1. A control valve comprising:
a valve cavity including an inlet port and an outlet port;
a poppet disposed within the valve cavity, the poppet comprising:
a plurality of vertical flow channels, wherein a bottom surface of the poppet faces the inlet port;
an orifice element disposed within the valve cavity between the poppet and the outlet port; and
a push rod;
wherein, the orifice element comprises:
a push rod slot for allowing the push rod to extend through the orifice element and contact the poppet to allow the push rod to move the poppet relative to the orifice element to open and close a gap between a top surface of the poppet and a bottom surface of the orifice element; and
a plurality of vertical flow channels extending from a bottom surface of the orifice element, through the orifice element, to a top exterior surface of the orifice element;
wherein the vertical flow channels of the orifice element are axially misaligned with the vertical flow channels of the poppet to prevent gas from flowing through the orifice element when the gap between the top surface of the poppet and the bottom surface of the orifice element is closed.

2. The control valve of claim 1, wherein the orifice element includes a plurality of horizontal flow channels.

3. The control valve of claim 2, wherein each of the horizontal flow channels intersects at least one of the vertical flow channels of the orifice element.

4. The control valve of claim 1, wherein each of the poppet and the orifice element include multiple channel-rings, wherein each channel-ring in each of the poppet and orifice element is made up of the vertical channels that are equidistant from a center of the corresponding poppet and orifice element.

5. The control valve of claim 1, wherein the orifice element includes support ridges defining surface flow passages on a top surface of the orifice element.

6. The control valve of claim 1, wherein the poppet includes a recessed portion to receive the push rod.

7. The control valve of claim 2, wherein each of the horizontal flow channels intersects other horizontal flow channels in a push rod cavity wherein the push rod cavity has a larger diameter section than the push rod slot.

8. The control valve of claim 1, wherein the orifice element includes a greater number of horizontal flow channels in a first 180-degree sector of the orifice element facing the outlet port than a second 180-degree sector of the orifice element facing away from the outlet port.

9. A control valve comprising:
a valve cavity including an inlet port and an outlet port;
a poppet disposed within the valve cavity, the poppet comprising plurality of vertical flow channels, wherein a bottom surface of the poppet faces the inlet port;
an orifice element disposed within the valve cavity between the poppet and the outlet port, the orifice element comprising:
means for directing a gas vertically and horizontally through the orifice element;
means for directing the gas along a top exterior surface of the orifice element; and means for directing movement of the poppet relative to the orifice element to open and close a gap between a top surface of the poppet and a bottom surface of the orifice element to control a flow of the gas through the control valve.

* * * * *